Figure 1:
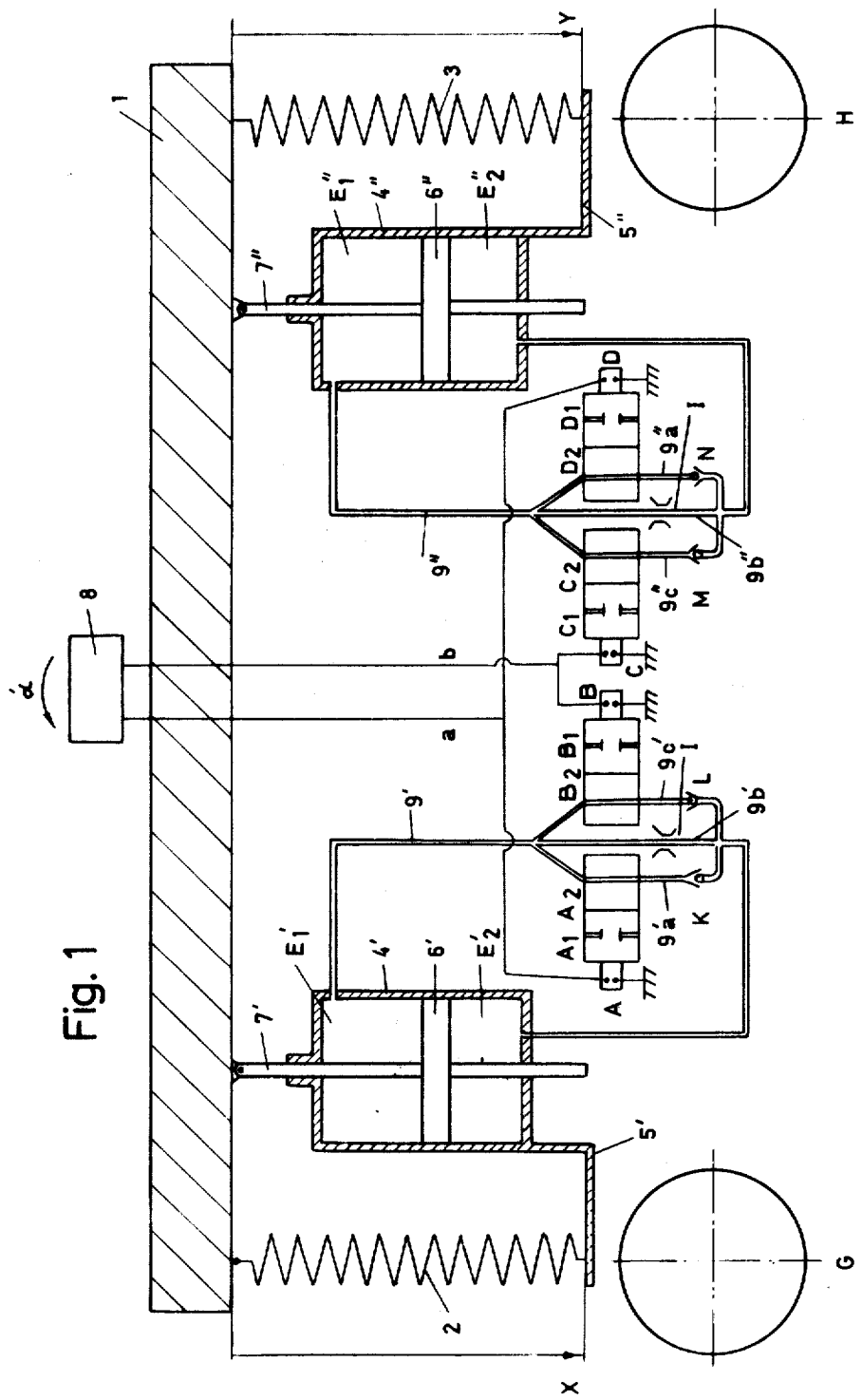

United States Patent [19]

Gustafsson

[11] 3,861,696

[45] Jan. 21, 1975

[54] DEVICE FOR DAMPING ROCKING MOVEMENTS OCCURRING IN A CHASSIS

[75] Inventor: Axel Gerhard Värne Gustafsson, Karlskoga, Sweden

[73] Assignee: Aktiebolaget Bofors, Bofors, Sweden

[22] Filed: June 1, 1972

[21] Appl. No.: 258,776

[52] U.S. Cl. ......... 280/6 H, 280/124 F, 180/79.2 R
[51] Int. Cl. .......................................... B62d 27/04
[58] Field of Search ............ 280/124 F, 124 R, 6 H, 280/111, 112 R, 6 R; 180/79.2 R

[56] References Cited
UNITED STATES PATENTS

| | | | |
|---|---|---|---|
| 3,011,579 | 12/1961 | Milliken et al. | 180/79.2 R |
| 3,625,483 | 12/1971 | Stoner | 280/6 H |
| 3,643,970 | 2/1972 | Gauchet | 280/124 F |
| 3,703,298 | 11/1972 | Laverda | 280/6 H |
| 3,736,003 | 5/1973 | Ono | 280/124 F |

*Primary Examiner*—David Schonberg
*Assistant Examiner*—John A. Carroll
*Attorney, Agent, or Firm*—Pollock, Philpitt & Vande Sande

[57] ABSTRACT

Apparatus for damping the rocking movements of a vehicle chassis. A damping means is provided which is operatively connected between the chassis and each vehicle wheel, and such damping means includes a means for varying the damping effect thereof. The apparatus further includes a means which is responsive to rocking movement of the chassis which generates a manifestation representative of such rocking movement. A control means which may comprise a plurality of hydraulic valves is governed by the aforesaid manifestation from the rocking responsive means to increase the damping effect on the upward and downward movement of the associated wheel relative to the chassis.

14 Claims, 2 Drawing Figures

DEVICE FOR DAMPING ROCKING MOVEMENTS OCCURRING IN A CHASSIS

The present invention relates to a device for damping rocking movements in a chassis and comprises at least one damping element applied between the chassis and a wheel arranged at a suspension point in the chassis and to which the element has been allotted.

The invention is particularly well suited for use on cross-country vehicles which have at least four wheels which, in principle, are each positioned at a corner of the chassis. The invention can moreover be used to advantage in other kinds of vehicles and trailers, even two-wheeled trailers, when there is a need to damp vertical translational movements, in which the vehicle or trailer rocks up and down, or experience torsional vibrations around a horizontal axis at right angles to the direction in which the vehicle is travelling, or in which the four-wheeled vehicle alternatingly moves the front and rear ends upwards and downwards (e.g., it depresses and elevates). The invention can, of course, also be utilized for damping of rocking movements about a torsion axis coinciding with the direction in which the vehicle is travelling if this may possibly be required.

For vehicles with spring suspension, both the first-mentioned translational vibration and the torsional vibration often have a natural frequency of the order of 1 c.p.s. which frequency is considered to be appropriate for avoiding sea-sickness.

For most types of cross-country vehicles, the disturbing forces which come from the ground and influence the spring suspension have a random distribution in time, but are dependent on the speed of the vehicle and the characteristics of the ground. The disturbance almost always contains frequencies sufficiently close to the natural frequency of the vehicle to make damping necessary. The inconvenience it is endeavoured to avoid through the damping is concerned with comfortable riding, strength and function, and as an example of the last-mentioned factor can be mentioned the difficulties involved in firing with a machine gun with sufficient precision from a tracked vehicle.

It has previously been proposed to achieve the damping according to a number of different principles. A common feature of most of the damping devices is, however, that they achieve a damping force directed against the speed movements of the wheel relative to the chassis of the vehicle. If this relative speed is designated $x$ and the damping force $F$, we obtain the equation $F = f(\dot{x})$. With frictional damping, $f(\dot{x})$ roughly consists of a step function. In hydraulic damping, in which the damping is achieved with a fixed constriction, the damping will be progressive, i.e., the damping force increases as the speed of the wheel increases. In assymmetrical hydraulic damping, which is the kind most often used, it is endeavoured to avoid damping at the inward deflection of the wheel, and the damping is done when the wheel is deflected outwardly. Damping during the deflection of the wheel cannot be avoided entirely. The types of damping characteristic mentioned can also be combined, so that at zero speed of the wheel, a step function is obtained, and thereafter a linearily increasing damping force, increasing with the speed of the wheel, which can also be made different for the inward and outward deflection movements of the wheel.

It is obvious that the damping devices here described are not ideal. At great, high-frequency movements of the wheel, a high effect is developed at the dampers, and the chassis is influenced by considerable forces, notwithstanding the fact that the frequency of these disturbances is far from the natural frequency of the vehicle.

The present invention solves this problem by creating a device which achieves better damping and which in addition thereto gives a saving of power, less heating of the damping device, and less disturbing forces close to the chassis.

The present invention is based upon the concept that the damping force is guided so that it is engaged or increased only when the vehicle body is rocking, and then so that it strives to prevent this rocking. A prerequisite for this is access to a fixed co-ordinate system.

The device according to the invention can be applied so that it damps said torsional vibrations, and it can then be appropriate to utilize an angular velocity around the members for sensing the torsional movement in question, or said translational movements, which can be sensed by means of e.g., a flexibly suspended mass at each wheel suspension point or at the front and rear ends of the vehicle. It should then be mentioned that if it is the intention to damp the translational vibrations, both kinds of rocking movements will be damped.

The feature that can mainly be considered to characterize a device according to the invention which is utilized in its most general embodiment wherein at least one damping element is placed between the chassis and a wheel arranged at a suspension point in the chassis and to which the element has been allotted, is that the damping element is connected with a control member which, in dependence of a signal from a unit for sensing rocking movements, actuates the damping element so that this, when the wheel in its spring suspension is deflected in towards and/or out from the chassis, momentarily engages or increases the damping force of the wheel when the rocking causes a movement directed downwards or upwardly, respectively, relative to the chassis at the suspension point.

Figure 2:
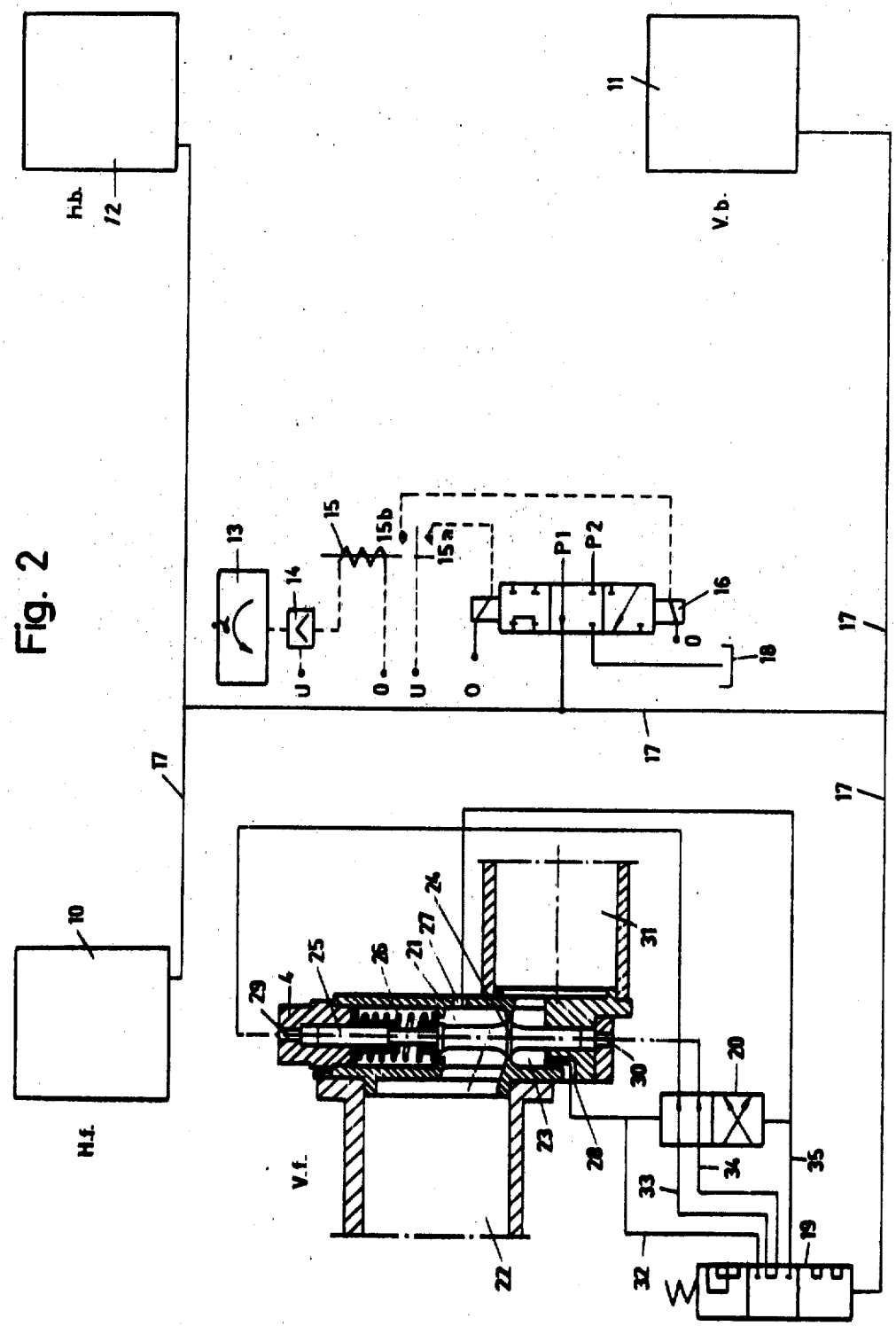

Embodiments proposed at present of a device which has the characteristics significant for the invention will be described in the following, with reference to the attached drawings, in which:

FIG. 1 is a front view, partly in cross-section, showing the construction in principle of the device applied to a vehicle with at least 4 wheels; and FIG. 2 shows in a schematic form a practical example of the embodiment of the device applied to a four-wheeled vehicle, as well as in a front view, and partly in cross-section, a damping element utilized in the example.

In FIG. 1, a chassis of a vehicle is indicated by the reference number 1, and the chassis in the example of the embodiment is provided with four wheels, of which only two wheels G and H are shown in the figure. All of the four wheels are mounted on the chassis with spring suspension, one wheel at each corner of the chassis, and the spring suspension is indicated with a spring 2 for wheel G and a spring 3 for wheel H. The wheels can move in directions towards and out from the chassis, which can be symbolized with positive and negative values on the arrows $x$ and $y$. Between the wheel and chassis, respectively, damping elements 4' for wheel G and 4'' for wheel H are connected. The damping elements are identical, and comprise a cylinder which via a link arm 5', 5'' is fixed to the wheels G and H respectively, below the wheel spring in question. Each damping element also comprises a piston 6', 6'' which with its piston rod 7', 7'' is mounted to the chassis 1. The space for the cylinders 4 above the piston 6 is designated $E_1'$, $E_1''$, while the space below the piston has the designation $E_2'$, $E_2''$.

The damping elements for all four wheels are connected with a control member which in the example of the embodiment comprises four solenoid valves A, B, C and D. The other wheel in the pair of wheels in which G is comprised is connected in the corresponding way as G to the control member and the corresponding situation is applicable for the other wheel in the pair of wheels in which H is comprised, this wheel being connected in the same way as H. The solenoid valves in the control member actuate the respective damping element 4 in dependence on signals from a unit 8 for sensing rocking movements in the chassis, which in FIG. 1 consists of a member for sensing the angular velocity $\alpha$ around a torsion axis at right angles to the direction in which the vehicle is travelling (and to the plane of the figure) which sensing member can consist of a gyro together with an electronic unit. This unit is connected with said solenoid valves with two conductors, $a$ and $b$, conductor $a$ then being connected to the operating windings on the solenoid valves A and D, while conductor $b$ is connected to the operating windings on the solenoid valves B and C.

The solenoid valves A and B also coact with the damping element for the wheel G and the damping element for the wheel which makes a pair with the wheel G, while the solenoid valves C and D coact with the damping element for the wheel H and the damping element for the wheel which makes a pair with the wheel H. In each damping element the space $E_1$ is connected with the space $E_2$ via the hydraulic pipe 9 which at the respective pair of solenoid valves A, B and C, D branches into three parallel pipes 9a, 9b and 9c. Of the parallel pipes 9a', 9b' and 9c', the pipe 9a' passes the solenoid valve A, 9b' a throttle valve I, and 9c' the solenoid valve B. The solenoid valve A, like the valves B, C and D, has two positions. In one of its positions $A_1$, oil in the pipe 9a' is prevented from flowing from the space $E_1'$ to the space $E_2'$, while the same permits oil to flow from $E_1'$ to $E_2'$ when it is in its other position $A_2$ (i.e. the position according to FIG. 1). A flow-direction valve K fitted in the parallel pipe 9a' prevents oil from flowing via 9a' from $E_2'$ to $E_1'$ when the valve A is in position $A_2$. The solenoid valve B is connected in the corresponding way to the parallel pipe 9c', but with the difference that the flow-direction valve L of this parallel pipe is directed in the opposite direction, i.e., so that oil can flow via 9c' from $E_2'$ to $E_1'$ and not vice versa when the solenoid valve B shifts to its other position $B_2$ (i.e. the position shown in FIG. 1). In the corresponding way, the parallel pipe 9a'' is connected to the solenoid valve D with its positions $D_1$ and $D_2$ and the parallel pipe 9c'' is connected to the solenoid valve C with its positions $C_1$ and $C_2$. The pipe 9b'' has a throttle valve I and the pipes 9a'' and 9c'' and the flow-direction valves M and N, and M then permits oil to flow from $E_1''$ to $E_2''$ when the solenoid valve C is in position $C_2$ and N permits oil to flow from $E_2''$ to $E_1''$ when the solenoid valve D is in position $D_2$.

In the unactuated condition, which is the condition when no signal is transmitted from the unit 8 for sensing the angular velocity, all of the solenoid valves are in their second positions, which are the positions shown in the FIG. 1.

An example of such a state is when the vehicle is being driven over a field, the uneven condition of which gives high and uniform disturbances, e.g., a hard-frozen plowed field, and which does not cause any rocking movement of the vehicle. Oil pumped by the pistons of the damping element can then pass freely via the solenoid valves between the spaces $E_1$ and $E_2$, which then results in small damping forces on the wheels.

When the vehicle passes a mound or pit which causes a certain turning around said torsion bar which is at right angles to the direction in which the vehicle is travelling, the unit 8 gives a signal. If the vehicle at that instant is turned so that the direction arrow $\alpha'$ shown in FIG. 1 for the turning velocity is positive, a signal is provided by the unit 8 on the conductor $b$ which causes the solenoid valves B and C to be actuated to one of their positions $B_1$, $C_1$ while the solenoid valves A and D remain in their unactuated positions. As a result if the wheel G, during the downwardly directed movement of the chassis at the part where the wheel G is suspended, is pressed up by the ground against the chassis, the oil flow on its way from $E_2'$ to $E_1'$ will be checked and the throttle I, by the solenoid valve B will stop the flow in the pipe 9c'. The presssure in $E_2'$ will thereby become greater than in $E_1'$, and the pressure difference which actuates the piston area between $E_1'$ and $E_2'$ will achieve a force which acts in such a direction that it strives to reduce $\alpha'$. On the other hand, when the wheel G, during the downwardly directed movements of the chassis at the part where the wheel G is suspended, is permitted by the ground to move outwards (downwards) in relation to the chassis, the flow of oil on its way from $E_1$ to $E_2$ is not checked, as the oil has an open passage through the valve A, which is in its position $A_2$, and the non-return valve K.

If the wheel H is considered at the studied instant, the corresponding situation will be found, i.e., that the damping force for the wheel H increases during the outward movements of the wheel H in relation to the chassis, while the damping force is small during the movements inwards of the wheel: consequently, the wheel H will not contribute towards an increase of the vibration movement that has commenced.

The described functions of the damping elements 4' and 4'' will be reversed when the unevenness of the ground instead cause the turning velocity $\alpha'$ to be negative. Under this condition, the electronics in the unit 8 will give a signal through the conductor a, which in turn involves an actuation of the solenoid valves A and D, while B and C will remain unactuated. The damping element 4'' will increase the damping force at the wheel H when this moves inwardly towards the chassis, which moves downwardly at the wheel H at the same time, and the damping element 4' will increase the damping force during the outward movement of the wheel G, so that this wheel will not increase the movement that has commenced.

The momentary engagement of the damping force shown above will counteract said rocking movements in the chassis to a considerably greater extent that hitherto known devices have been capable of achieving.

FIG. 2 shows a device which utilizes the invention and in which there are damping elements 4 which are known per se, each of which is positioned at a respective wheel of a vehicle which is provided with four wheels that can be damped. The respective damping elements are applied to the chassis and wheel in a similar way as the device according to FIG. 1, and therefore the wheels are not shown in the drawing. The four damping elements are identical, and therefore only the damping element for the left front wheel (v.f.) will be shown in more detail, while the other damping elements will be symbolized with squares 10 (h.f.), 11 (v.b.) and 12 (h.b.). For the purpose of facilitating the installation of the pipes, some of the components of the control member have been placed at the respective damping elements 4, and it has been assumed that the components in question for these are included in the squares 10–12.

In FIG. 2, a member for sensing the angular velocity, α, e.g., a gyro, is designated 13. The member 13 coacts with an electronic unit comprising a contact device 14 and a relay 15. The relay controls a three-way valve 16 included in the control member which, in dependence of its position via the return pipes 17, can connect one of the pressure sources $P_1$ and $P_2$ or a return pipe 18 to further components included in the control member applied at the respective damping element and consisting of a further three-way valve 19 and a two-way valve 20.

The damping element 4 itself, in the form of a previously known hydro-pneumatic spring, is connected with a first space 21 to a cylinder 22 belonging to the spring and with a second space 23 it is connected to a hydro-pneumatic accumulator 31. The first and the second spaces are separated by a piston 24 on a piston rod 25 which is movably supported in its longitudinal direction in the damping element. The piston rod is then supported at both ends, and is also actuated by a spring 26, which in a known way is arranged to actuate the piston rod towards a rest position, in which the piston 24 separates the first space from the second space (i.e., the position according to FIG. 2) regardless of whether the rod is moved upwardly or downwardly by the oil pressure. The damping element has four connection channels, viz. one for each of the first and second spaces, the first space then having a channel 27 and the second space a channel 28, as well as one for each of the ends of the piston rod 25, the upper end of the piston rod then having the channel 29 and the lower end of the piston rod having a channel 30. The channels 27 and 28 are connected via hydraulic pipes with the valves 19 and 20, while the channels 28 and 30 are connected only to the valve 20. The pressure in the spaces 21 and 23 determine the position of the two-way valve 20, which in FIG. 2 is in one of its positions. The damping elements for the left and right front wheels work in a parallel manner, and so do the damping elements for the left and right rear wheels.

When there is no rocking movement in the vehicle, no signal is transmitted to the relay 15 and to the solenoid valve 16 which has the position shown in FIG. 2. If the valve 19 is then considered, it will be noted that the pressure connected via the pipe to this valve is adapted to keep the valve in its central position (i.e., the position according to FIG. 2). If it is then assumed that the left front wheel is pressed inwardly in relation to the chassis by the ground, the pressure in the space 21 will increase, which pressure will actuate the valve 20 from the position according to FIG. 2 to its other position, but this does not cause any difference in the pressure at the ends of the piston rod 25, which piston ends are connected with each other via the valve 19. The pressure in the space 22 can actuate the valve 24 downwardly so that there will be a flow of oil between 22 and 31, with the result that there will be little damping. The corresponding function will occur when the wheel moves outwardly, and the over-pressure in 31 presses the piston outwards, with the result that little damping is obtained.

If the front end of the vehicle tips downwardly so that α will be positive, the relay 15 receives operating current, and the contact 15a is closed by a valve 16 which connects the source of under-pressure 18 to the valve 19, which then connects a pipe 32 connected with the channel 28 with a pipe 34 between the valves 19 and 20, and the channel 28 to a pipe 33 between the valves 19 and 20. When the wheel, at the same time, moves inwardly, the pressure will increase in the space 21, and via the channel 27 it will actuate the valve 20 to its other position, whereby the pressure also via the hydraulic pipes 35 and 33 and the valve 20 will actuate the end of the piston at the channel 30. The result is that the piston 24 strives to remain in the position shown in FIG. 2. The damping force at the wheel is thus engaged. When the wheel moves outwardly, the movement downwardly of the chassis taking place at the same time, the valve 20, owing to the over-pressure occurring in the space 23, will actuate the valve to one of its positions (i.e., the position shown in FIG. 2). The pressure in the space 23 is connected via the channel 28 and the hydraulic pipes 32 and 34 by the valves 19 and 20 to the end of the piston at the channel 30, with the result that the piston 24 moves upwardly, and there will then be a flow of oil, and only insignificant damping is obtained.

If the vehicle is elevated instead of being depressed by the rocking that takes place, so that α will be negative, the contact 15b in the relay 15 is closed, and the source of pressure $P_2$ is connected to the valve 19 so that this can move into its third position, where it joins the hydraulic pipes 32 and 33 and 34 and 35. In a similar way, as described above, it will then be noted that damping takes place when the wheel moves outwardly, but little damping is obtained when it moves inwardly.

The damping elements are co-ordinated in a similar way as in the device according to FIG. 1, damping then being obtained in one pair of wheels and an increase of the movement in the other pair of wheels is prevented.

As regards particularly the member for sensing the rocking movements, instead of consisting of a gyro for sensing the angular velocity and an electronic unit, it can consist of any one of a number of other elements. Thus, it is possible to use a pendulum suspended in the chassis and driving a generator, so that the speed of the generator will be proportional to the relative speed between the pendulum and the chassis. The pendulum can be made, in a known way with or without an electronic unit, to transmit signals of the same character as those obtained with the gyro mentioned above. However, the pendulum has the characteristic that it is not only dependent upon the perpendicular, but also on the movement condition, (the linear acceleration) at its suspension point. A physical pendulum with the mathematical length of the pendulum equal to the earth radius is, of course, not in this way dependent on accelerations horizontally in the suspension point, but due to unavoidable friction it does not function as a pendulum but as a flywheel. Appropriately adapted, however, the dependence of the pendulum on the horizontal acceleration at the suspension point is no drawback at this application, as the pendulum, upon a braking movement, is caused to swing forwards, with the result that it indicates that the vehicle is depressing. In the corresponding way, deflections of the pendulum take place at time of acceleration. The natural frequency of the pendulum and the damping ratio are chosen in each individual case so that the pendulum substantially gives the generator such an angular velocity that this transmits a voltage which has a positive value, the value 0 or a negative value when the angular velocity of the chassis in a fixed co-ordinate system has a positive value, is 0, or has a negative value. In order to avoid natural frequency of a pendulum suspended in this way, it can be allowed to coact with a further pendulum which is chosen in such a way that its natural frequency differs from the natural frequency of the first-mentioned pendulum, and the two pendulums can then be damped against each other in a way which is known in itself. Instead of a pendulum, it is possible to utilize a flywheel arranged in a corresponding way.

It is also possible to use a pendulum or a flywheel as described above which, instead of a generator, drives a cam curve. The pendulum or flywheel should then, via a relatively flexible friction clutch, transmit a torque to the cam curve which has a limited and small torsional angle. When the pendulum or the flywheel moves relative to the chassis in one direction, the cam curve is held towards one of its turning limits, while upon movement in the other direction, the cam curve is held towards its other turning limit. When the pendulum or flywheel is stationary in the perpendicular, the cam curve is between its limiting positions. At its limiting positions, the cam curve actuates switches which give the signals desired. The cam curve and the switches can be replaced by other known members for obtaining electrical signals in certain angular positions. Further, the pendulum or flywheel as described above can be applied with its axles fastened in the chassis, and the movement on these axles can be measured in a known way, e.g., with a strain gauge, while an electronic unit in a known way converts the signals obtained from the strain gauges into signals which can be used in this connection.

If the vehicle supports a gyro-stabilized platform of any kind, this, via a flexible friction clutch can drive a cam curve or some other member like the one described above, and with the same result as is obtained with the flywheel and the pendulum, but with the difference, however, that the pendulum or flywheel is replaced by the gyro-stabilized platform.

If it is intended to dampen vertical translational movements of points on the vehicle, for the control and damping it is possible to use a flexibly supported mass, the movements of the masses then being measured at both ends of the vehicle. The movement in relation to the chassis drives e.g., an electric generator. It is also possible to allow the movements of the mass to be transmitted via slip friction or in some other known way to a cam curve which via the above-mentioned switches gives signals to magnets, as described above. Finally, it is possible to arrange a mass thus suspended in the chassis via a force-sensing member. The signal from the force-sensing member is processed in an electronic unit in a known way, so that signals comprising analogs of those previously described are obtained. The signal from a force transducer is in phase with the acceleration of the mass, and these signals are converted in the electronic unit so that the output signals give information about the vertical speed. A characteristic in common for all of the embodiments of the member for sensing the rocking movements is that they give a signal when the torsion and its velocity reach a predetermined value.

The invention is not limited to the embodiments shown above as examples, but can also be subject to modifications within the scope of the following claims. Thus, for instance, the device can be made so that it counteracts the rocking movement only during the movements inwards or outwards of the wheels, i.e., in the above-mentioned example permits augmenting forces from one of the pairs of wheels, or only prevents these forces.

I claim:

1. Apparatus for damping the rocking movements of a vehicle chassis comprising:
    said chassis being provided with at least four wheels, one at each corner, and a damping means operatively connected between the chassis and each vehicle wheel which wheel is further connected by means of suspension apparatus to the chassis,
    said damping means including means for varying the damping effect thereof,
    means responsive to the angular velocity of the chassis about a predetermined axis for generating a manifestation representative of such rocking movement and with said manifestation having a sign indicative of the direction of such angular velocity,
    and control means governed by the magnitude of said manifestation and its sign for selectively increasing or decreasing the damping effect of said damping means on the upward and downward movement of the associated wheel relative to the chassis.

2. Apparatus according to claim 1 wherein said responsive means comprises a member for sensing angular velocity of the chassis about a horizontal axis at right angles to the direction of movement of the chassis.

3. Apparatus according to claim 2 wherein said control means is controlled by said manifestation when the chassis is depressed to increase the damping forces for the front wheels when these move inwardly toward the chassis while concurrently increasing the damping forces for the rear wheels when these move outwardly from the chassis.

4. Apparatus according to claim 2 wherein said control means is controlled by said manifestation when the chassis is elevated to increase the damping forces for the front wheels when these move outwardly from the chassis while concurrently increasing the damping forces for the rear wheels when these move inwardly toward the chassis.

5. Apparatus according to claim 2 wherein said responsive means comprises a gyro responsive to the angular velocity of the chassis about said axis for generating said manifestation.

6. Apparatus according to claim 1 wherein said chassis at both its front and rear wheels includes a flexibly suspended mass.

7. Apparatus according to claim 1, characterized in that the member (8) for sensing angular velocity comprises a pendulum suspended in the chassis.

8. Apparatus according to claim 7, characterized in that the pendulum coacts with a further pendulum in order to obtain an appropriate damping of the pendulum function.

9. Apparatus according to claim 1, characterized in that the member (8) for sensing angular velocity comprises a flywheel suspended in the chassis.

10. Apparatus according to claim 9, characterized in that the flywheel actuates a generator so that the speed of this will be proportional to the relative speed between the flywheel and the chassis.

11. Apparatus according to claim 9, characterized in that the flywheel drives a cam curve via a relatively flexible friction clutch, it then being possible for the cam curve and the pendulum to be actuated to two limiting positions, in which limiting positions it actuates switches, which transmit signals to the control member.

12. Apparatus according to claim 9, characterized in that forces occurring in the suspension member for the flywheel are sensed with the aid of signal converters which coact with an electronic unit which transmits a signal to the control member.

13. Apparatus for damping the rocking movements of a vehicle chassis as it moves over an uneven supporting surface comprising:

means responsive to a rocking motion of said chassis;

a damping means operatively connected between the chassis and each vehicle wheel which wheel is further connected by means of suspension apparatus to the chassis, each said damping means providing a predetermined damping effect for the associated wheel in the absence of any rocking of the vehicle chassis;

control means for varying the damping effect of each said damping means, said control means being controlled by a rocking of said chassis as sensed by said responsive means so as to:

a. increase the damping effect only on inward movements of said wheel relative to said chassis on only those damping means associated with a part of the vehicle which is moving downwardly towards the supporting surface; and b. increase the damping effect only on outward movements of said wheel relative to said chassis on only those damping means associated with a part of the vehicle chassis which is moving upwardly away from said supporting surface.

14. Apparatus according to claim 13, characterized in that the means responsive to rocking motion comprises a mass flexibly suspended in the chassis for sensing rocking movements in the form of vertical translational movements, and means operatively connected to said mass for generating a signal which is supplied to said control means.

* * * * *